Patented Dec. 30, 1941

2,267,748

UNITED STATES PATENT OFFICE 2,267,748

SULPHONE COMPOUND

Paul Pöhls and Robert Behnisch, Wuppertal-Elberfeld, Germany, assignors to Winthrop Chemical Company, Inc., New York, N. Y., a corporation of New York No Drawing. Application February 24, 1940, Serial No. 320,719. In Germany March 23, 1939

10 Claims. (Cl. 260—507)

This invention relates to new sulphone compounds which are useful as therapeutics.

4,4'-diamino-diphenylsulphone and certain of its derivatives are active against the streptococci infection of warm-blooded individuals. These compounds, however, are unsuitable for injection, since the mineral acid salts of the 4,4'-diamino-diphenylsulphone react acid to Congo due to the slight basicity of the base and, therefore, give rise to the formation of necroses upon subcutaneous injection. Apart from that the base gives rise to the formation of methaemoglobin. The 4,4'-diacetyldiamino-diphenylsulphone also is well effective but likewise does not satisfy all therapeutic requirements. The said products are practically insoluble in water, so that they can be injected only in suspension. Also colorless derivatives of 4,4'-diamino-diphenylsulphone which are readily soluble in water and are suitable for injection and active in streptococci infections have been described. They have been prepared by reacting both the amino groups of 4,4'-diamino-diphenylsulphone with formaldehyde-sulphoxylate or cinnamaldehyde-bisulphite. The water-soluble compounds thus obtained, however, are not very stable and their activity is considerably decreased as compared with the activity of the parent substance. We have further established that when converting 4,4'-diamino-diphenylsulphone into its N-bismethylsulphonic acid compound by the action of formaldehyde-bisulphite, a product nearly inactive against streptococci infections is obtained.

In accordance with the present invention stable products which are readily soluble in water and which have a considerably improved activity are obtainable when converting 4-acylamino-4'-aminodiphenylsulphones into 4-acylamino-diphenylsulphone-4'-aminoalkyl sulphonic acids, their water-soluble salts respectively. In the said compounds the alkyl group may contain one or several carbon atoms and may be substituted by cyclic radicals, such as for instance phenyl and substituted phenyl radicals, furyl radicals, etc. The sulphonic acid group may be present once or several times in the alkyl radical. The acyl group is preferably the acetyl radical, but also other usual acyl radicals, such as propionyl, butyryl, valeroyl and benzoyl may be present.

The new products are obtained, for instance, by reacting upon a 4-acylamino-4'-aminodiphenylsulphone with an aldehyde and with a metal bisulphite, preferably an alkali metal bisulphite, or with the bisulphite compound of an aldehyde; the new products are also obtained by the addition of bisulphite to the condensation products of 4-acylamino-4'-aminodiphenylsulphone with an aldehyde. The bisulphite addition compounds to condensation products of unsaturated aralkyl aldehydes, such as cinnamaldehyde, with 4-acylamino-4'-aminodiphenylsulphone are considerably superior to the known similar compounds as to their activity against streptococci infections. The new compounds are preferably used in the form of their sodium salts, in the form of the aqueous solution thereof, respectively. But also other water-soluble salts, such as the potassium, lithium, calcium and strontium salts may be prepared.

The invention is illustrated by the following examples without, however, being restricted thereto:

Example 1

15 grams of 4-acetylamino-4'-amino-diphenylsulphone, 25 ccs. of glycol and 8 grams of formaldehyde-sodiumbisulphite are heated for 10 minutes to 130–140° C. The hot solution is filtered and the filtrate is slowly treated with alcohol, whereupon the sodium salt of the 4-acetylamino-diphenylsulphone-4'-aminomethylsulphonic acid precipitates in well-shaped colorless crystals. The precipitation is completed by the addition of ether, then the precipitate is filtered with suction, washed with alcohol and ether and dried. The product has the formula:

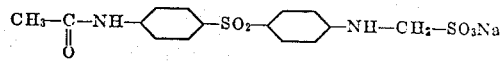

When starting with 4-propionylamino- and 4-benzoylamino-4'-aminodiphenylsulphone, the sodium salts of 4-propionyl- and of 4-benzoylamino-diphenylsulphone-4-aminomethylsulphonic acid are obtained in an analogous manner.

Instead of the sodium salts the potassium and calcium salts are obtained when starting with formaldehyde-potassiumbisulphite or formaldehyde-calciumbisulphite.

Example 2

28 grams of 4-acetylamino-4'-cinnamylidenamino-diphenylsulphone are introduced while stirring into a solution of 20 grams of sodium bisulphite in 70 ccs. of water at 80–85° C. The product dissolves at once. After 10 minutes' stirring at 80° C. the mixture is filtered and after cooling the filtrate is introduced while stirring into 500 ccs. of a 35% sodium chloride solution. The di-sodium salt of the 4-acetyl-amino - diphenylsulphone-4'-amino-γ-phenyl-propyl-α.γ-disulphonic acid precipitates; it is filtered with suction and reprecipitated from a 20% sodium chloride solution. It is readily soluble in water with neutral reaction and has the formula:

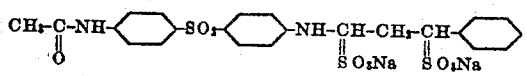

In a similar manner 4-acetylamino-4'-(4''-methyl- or 4''-methoxy-cinnamylidenamino)-diphenylsulphone may be reacted with sodium-bisulphite.

Example 3

10 grams of 4-acetylamino-4'-(4''-methoxy-benzylidenamino)-diphenylsulphone are introduced while stirring into a solution of 3 grams of sodium bisulphite in 50 ccs. of water at 80-85° C. After 10 minutes' stirring at 80° C. the whole is dissolved. The reaction solution is filtered from a small quantity of undissolved matter and the filtrate is introduced while stirring into 300 ccs. of a 35% sodium chloride solution. The sodium salt of the 4-acetyl-amino-4'-(α-sulphonic acid - 4'' - methoxybenzylamino) - diphenylsulphone precipitates and is reprecipitated from a 20% sodium chloride solution. It has the formula:

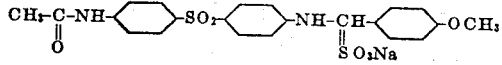

In the same manner 4-acetylamino-4'-(4''-methyl-benzylideneamino)-diphenylsulphone or Schiff's bases of the 4-acetylamino-4'-aminodiphenylsulphone with phenylacetaldehyde, furfurol or furylacrolein may be reacted with sodium bisulphite.

Instead of the 4-acetylamino-4'-aminodiphenylsulphone also compounds of the 4,4'-diaminodiphenylsulphone with a higher acyl radical, preferably of the aliphatic series, such as propionyl, butyryl, valeroyl, etc., may be employed.

We claim:

1. A compound selected from the group consisting of 4 - acylamino - diphenylsulphone-4'-aminoalkylsulphonic acids and their water-soluble salts.

2. A compound selected from the group consisting of 4-acetylamino-diphenylsulphone-4'-aminoalkylsulphonic acids and their water-soluble salts.

3. A compound selected from the group consisting of 4 - acylamino - diphenylsulphone-4'-aminomethylsulphonic acids and their water-soluble salts.

4. A compound selected from the group consisting of 4 - acetylamino-diphenylsulphone-4'-aminomethylsulphonic acid and its water-soluble salts.

5. A compound selected from the group consisting of 4 - acylamino - diphenylsulphone-4'-amino-phenylalkylsulphonic acids and their water-soluble salts.

6. A compound selected from the group consisting of 4 - acetylamino-diphenylsulphone-4'-amino-phenylalkylsulphonic acids and their water-soluble salts.

7. A compound selected from the group consisting of 4 - acylamino - diphenylsulphone-4'-amino-γ-phenylpropyl-α.γ-disulphonic acids and their water-soluble salts.

8. A compound selected from the group consisting of 4 - acetylamino-diphenylsulphone-4'-amino-γ-phenylpropyl-α.γ-disulphonic acid and its water-soluble salts.

9. Sodium - 4 - acetylamino-diphenylsulphone-4'-aminomethylsulphonate.

10. A compound selected from the group consisting of 4 - acylamino - diphenylsulphone-4'-aminoalkyl sulphonic acids, 4-acylamino-diphenylsulphone-4'-aminophenylalkyl sulphonic acids and their water-soluble salts.

PAUL PÖHLS.
ROBERT BEHNISCH.

CERTIFICATE OF CORRECTION.

Patent No. 2,267,748.  December 30, 1941.

PAUL POHLS, ET AL.

It is hereby certified that error appears in the printed specification of the above numbered patent requiring correction as follows: Page 2, first column, lines 9 to 11 inclusive, both occurrences, and lines 32 to 34 inclusive, for that portion of the formula reading

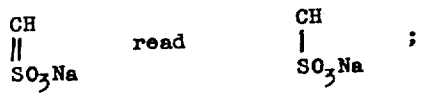

and that the said Letters Patent should be read with this correction therein that the same may conform to the record of the case in the Patent Office.

Signed and sealed this 5th day of June, A. D. 1945.

Leslie Frazer
Acting Commissioner of Patents.

(Seal)